(12) United States Patent
Hahn et al.

(10) Patent No.: US 6,314,487 B1
(45) Date of Patent: Nov. 6, 2001

(54) ADAPTIVE ROUTING CONTROLLER OF A CROSSBAR CORE MODULE USED IN A CROSSBAR ROUTING SWITCH

(75) Inventors: Jong Seok Hahn; Won Sae Sim; Woo Jong Hahn; Suk Han Yoon, all of Taejon-shi (KR)

(73) Assignee: Electronics and Telecommunications Research Institute, Taejon-shi (KR)

( * ) Notice: Subject to any disclaimer, the term of this patent is extended or adjusted under 35 U.S.C. 154(b) by 0 days.

(21) Appl. No.: 09/209,429

(22) Filed: Dec. 11, 1998

(30) Foreign Application Priority Data

Dec. 26, 1997 (KR) .................................................. 97-74745

(51) Int. Cl.[7] .................................................. G06F 13/00
(52) U.S. Cl. .......................... 710/132; 370/351; 370/389
(58) Field of Search .................................... 370/351, 356, 370/416, 230, 232, 389; 709/239, 213; 710/240, 131, 132

(56) References Cited

U.S. PATENT DOCUMENTS

| | | | |
|---|---|---|---|
| 4,890,281 | 12/1989 | Balboni et al. ...................... | 709/239 |
| 5,175,733 | 12/1992 | Nugent ................................ | 370/400 |
| 5,181,017 | 1/1993 | Frey, Jr. et al. ...................... | 370/415 |
| 5,517,495 | * 5/1996 | Lund et al. ............................ | 370/416 |
| 5,838,684 | * 11/1998 | Wicki et al. .......................... | 370/416 |
| 5,915,092 | * 6/1999 | Morita et al. ......................... | 709/213 |
| 6,014,722 | * 1/2000 | Rudin et al. .......................... | 710/240 |
| 6,044,061 | * 3/2000 | Aybay et al. ......................... | 370/230 |
| 6,046,982 | * 4/2000 | Ozveren et al. ...................... | 370/232 |
| 6,061,345 | * 5/2000 | Hahn et al. ........................... | 370/351 |
| 6,128,292 | * 10/2000 | Kim et al. ............................. | 370/356 |

FOREIGN PATENT DOCUMENTS 0588104   3/1994  (EP) .

* cited by examiner

*Primary Examiner*—Zarni Maung
*Assistant Examiner*—Jungwon Chang
(74) *Attorney, Agent, or Firm*—Antonelli, Terry, Stout & Kraus, LLP

(57) ABSTRACT

The present invention relates to a routing control apparatus for performing a round robin arbitration and an adaptive routing control. The present invention relates to a routing controller for performing an arbitration and a routing control which are nucleus functions of the crossbar routing switch and, in particular, to a normal routing controller unit for performing a priority based round robin arbitration and an adaptive routing controller unit for performing an adaptive routing control by adding an adaptive routing switch logic to the normal routing controller.

12 Claims, 4 Drawing Sheets

ADAPTIVE ROUTING CONTROLLER OF A CROSSBAR CORE MODULE USED IN A CROSSBAR ROUTING SWITCH

BACKGROUND OF THE INVENTION

Field of the Invention

The present invention relates to an adaptive routing controller of a crossbar core module used in a crossbar routing switch.

In general, for a parallel processing system to have an excellent performance by concurrently processing tasks in parallel in a plurality of processors by using a plurality of processors, an interconnection network for connecting a plurality of processors plays a very important role. The interconnection network consists of a routing switch, a backplane and a cable. The routing switch is a nucleolus part which performs a function of interconnection network.

Since the function of the routing switch is determined according to a structure and a function of each interconnection network, the routing switch of a particular interconnection network is designed and implemented to be adapted to the particular interconnection network. In addition, a routing controller must be designed to be adapted to a function and characteristics inherent to the routing switch. In other words, the routing controller which well supports the characteristics of the routing switch and provides an excellent performance and function plays a nucleolus role which determines the inherent characteristics, excellent function and performance of the routing switch. Furthermore, since this role leads to the characteristics and function of the interconnection network, the invention of the routing controller which well supports the inherent characteristics and provides the excellent performance and function is very important.

A switching device invented by G. P. Balboni et al. is a switching element for performing a self routing control in a multistage packet switching interconnection network(refer to G. P. Balboni et al., . . . Switching Element for Self-routing Multistage Packet-switching Interconnection Networks", U.S. Pat. No. 4,890,281, December 1989). The switching device is a unit device having 2X2 switch configuration and is a simple switching device controlled by one bit among a tag portion of a packet. The switching device does not have an arbitration concept. It performs the routing control by the simple tag bit, and has a two port simultaneous transmission function for broadcasting transmission. The switching device does not provide an arbitration and adaptive routing control method.

An interconnection network device proposed by S. B. Kim et al. is a switching device for performing the routing control in an interconnection network of mesh type(refer to S. B. Kim et al. interconnection network device", KR 66825, October 1993). The switching device can obtain a plurality of routings while avoiding a deadlock state in the interconnection network of mesh type, and has a routing control unit which performs the routing control only to the address determined by the packet tag and perform the arbitration via a simple 3X1 selector. The switching device is implemented with its own packet type and routing control method and provides only a basic routing control method.

A multipath torus switching apparatus invented by Olnowich and Williams is a switching device of Wormhole routing having small delay time in the interconnection network of torus mesh type(refer to H. T. Olnowich and A. R. Williams, . . . Multipath torus switching apparatus", EP 0588104A2, December 1994). The switching device is invented to determine a routing control port by adding a multipath establishment function to an existing torus switch. The switching device consists of four single routing controller and a multipath controller and selects an output port by using a connection command of packet. However, the switching device does not suggest a scheme of arbitration method, and has different packet type and routing control method. Although the switching device has a multipath control function similar to the adaptive routing control, since the configuration and method thereof are different, it can not be properly used to a crossbar routing switch.

An adaptive routing control method invented by Nugent is a method in which an additional connection path is established by connecting to an interconnection network of mesh type an additional interconnection network of identical type and thereafter performs the routing control via the additional connection path in case that a problem occurs to an existing routing or a transmission is impossible. (refer to Nugent, . . . Adaptive Message Routing for Multi-Dimensional Networks," U.S. Pat. No. 5,175,733, December 1992). The adaptive routing control method is a method in which when the routing control is impossible to X-direction and Y-direction, the adaptive routing control is performed to Z-direction by establishing an additional connection path to Z-direction. In case of the routing controller, it only performs a simple arbitration for two inputs and it is not appropriate to the adaptive routing control method and a switching device having a plurality of I/O ports.

An adaptive routing control switching device invented by A. H. Frey Jr. et al is a switching device for controlling the routing with a shortest distance up to a destination in a multi-dimension multi-node environment(refer to A. H. Frey Jr. et al., . . . Adaptive Routing in a Parallel Computing System". U.S. Pat. No. 5,181,017, January 1993). The switching device is a device by which only one packet which arrives fastest is effectively received by retrieving all routing possibly established from a source to a destination and transmitting simultaneously via all the paths. This method performs the adaptive routing control via a packet header, and the switching device provides only a mechanism for transmission and cancellation of the packet. The transmission of packet is terminated by only one time of packet transmission in other interconnection network, while there is a problem in the interconnection network of the switching device described above that a separate packet transmission is necessary for confirmation.

Most of conventional inventions are switching devices or appropriate arbitration methods for the multi-stage interconnection network or the mesh type interconnection network, and in addition, the adaptive routing control methods have many different methods and constitutions, therefore, most of conventional inventions can not provide routing controller adapted to the crossbar routing switch.

SUMMARY OF THE INVENTION

Therefore, the object of the present invention is to provide a priority based round robin arbitration method for offering fairness and preventing starvation in a routing controller which performs the arbitration and routing control function of the crossbar routing switch, and to provide a routing control apparatus for performing the round robin arbitration and adaptive routing control by inventing a Normal Routing Control Unit which performs the priority based round robin arbitration method and by adding an Adaptive Routing Switch Logic to two the Normal Routing Control Units.

The present invention is to provide a crossbar routing switch having a crossbar core module, a plurality of input control module and a plurality of output control module, comprises: a plurality of normal routing control logic for performing a priority based round robin arbitration and controlling an internal logic; an adaptive routing switch logic for receiving a signal of said normal routing control logic and a ready signal and outputting a plurality of corresponding arbitration selection sequential signals, status signals and arbitration selection combinational signals; and a plurality of mask registers for performing the priority based round robin arbitration, wherein said plurality mask registers include a plurality of normal transfer mask registers for connecting, bit by bit, ten bits of the normal arbitration request signal and ten bits driven from said normal routing control logic to the inputs of AND gates and for providing outputs back to said normal routing control logic, and a plurality of emergency transfer mask registers for connecting, bit by bit, ten bits of the emergency arbitration request signal and ten bits driven from said normal routing control logic to the inputs of AND gates and for providing outputs back to said normal routing control logic.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts in the several views of the drawings.

DETAILED DESCRIPTION OF THE PREFERRED EMBODIMENTS

A detailed description of the present invention will be described in detail below.

Figure 1:
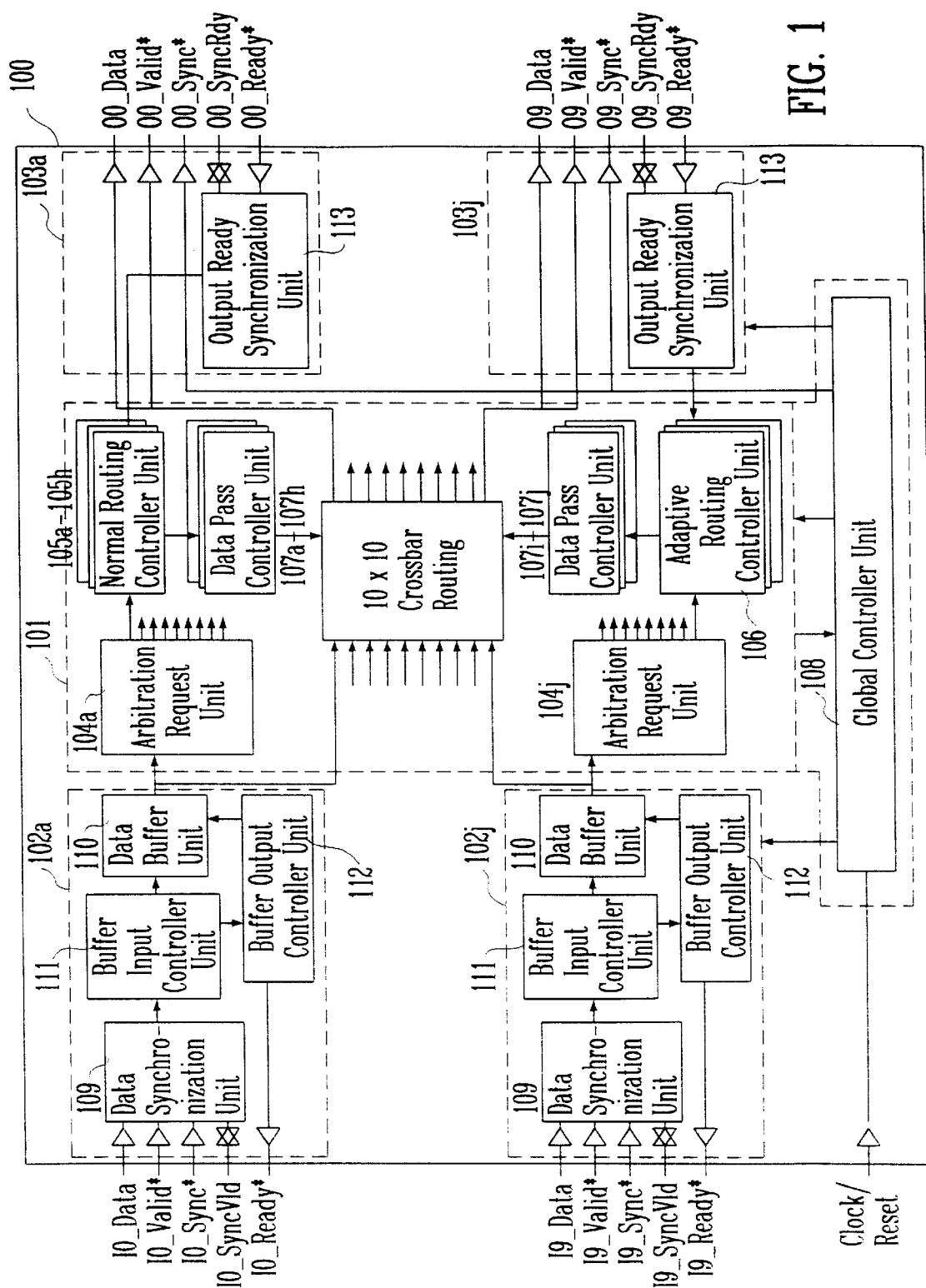
FIG. 1 is a schematic constructional view of a crossbar routing switch according to the present invention.

FIG. 1 shows a schematic constructional drawing of a crossbar routing switch 100 according to the present invention which consists of a crossbar core module 101, ten input controller modules 102a to 102j and ten output controller modules 103a to 103j.

The crossbar core module 101 comprises ten arbitration request units 104a to 104j, eight normal routing controller units 105a to 105h, and an adaptive routing controller unit 106, ten data pass controller units 107a to 107j and a global controller unit 108.

The arbitration request units 104a to 104j sense data driven at the output of a data packet buffer unit 110 of each input controller module 102a to 102j, recognize a tag part and data part and, request the arbitration to the corresponding routing controller units 105a to 105h and 106. The normal routing controller units 105a to 105h and the adaptive routing controller unit 106 recognize the corresponding arbitration request signals, perform the arbitration, notify the result to the data pass controller units 107a to 107j corresponding to the routing controller units 105a to 105h and 106. At this time, each normal routing controller unit 105a to 105h controls the data pass controller unit 107a to 107h in one-to-one relation, and the adaptive routing controller unit 106 controls the two data pass controller units 107i to 107j.

The data pass controller units 107a to 107j provide a physical transfer pass according to the arbitration result notified from the routing controller units 105a to 105h and 106 or the global controller unit 108.

The global controller unit 108 generates a control clock required to control each resource and performs the global control and broadcast control.

The input controller modules 102a to 102j each controls one input port among ten input ports and takes charge of sampling and synchronization of each input data, control of packet buffer and control of packet flow.

Each of input controller modules 102a to 102j comprises a data synchronization unit 109, a data buffer unit 110, a buffer input controller unit 111 and a buffer output controller unit 112.

The data synchronization unit 109 stores data by using a synchronization signal which is an external input and transfers the data to the data buffer unit 110 by controlling the synchronization of the external synchronization signal and the internal clock. If the data synchronization unit 109 is designated as a synchronization master, it drives its own synchronization signal SyncVld to other crossbar routing switches so that the byte-sliced routing switches store data to the data buffer unit 110 at a same time point. The data buffer unit 110 temporarily stores a packet being transferred if a collision occurs on a packet transfer routing. The buffer input controller unit 111 and buffer output controller unit 112 control the input and output flow of the data buffer unit 110 and notifies the status of the data buffer unit 110 to the crossbar core module 101.

The output controller modules 103a to 103j each controls one output port among ten output ports, synchronizes a flow control signal which is externally input, and transmits the status of the flow control signal to the crossbar core module 101 by reading the status of the flow control signal. The output controller modules 103a to 103j each comprises an output ready synchronization unit 113.

The output ready synchronization unit 113 synchronizes the flow control signal inputted from outside and transfer it to the global controller unit 108 in the crossbar core module 101. In the same manner as for the data synchronization unit 109, if the output ready synchronization unit 113 is designated as a synchronization master, it drives its own synchronized flow control signal SyncRdy to other crossbar routing switches so that the byte-sliced routing switches use the flow control signal at the same time point.

Figure 2:
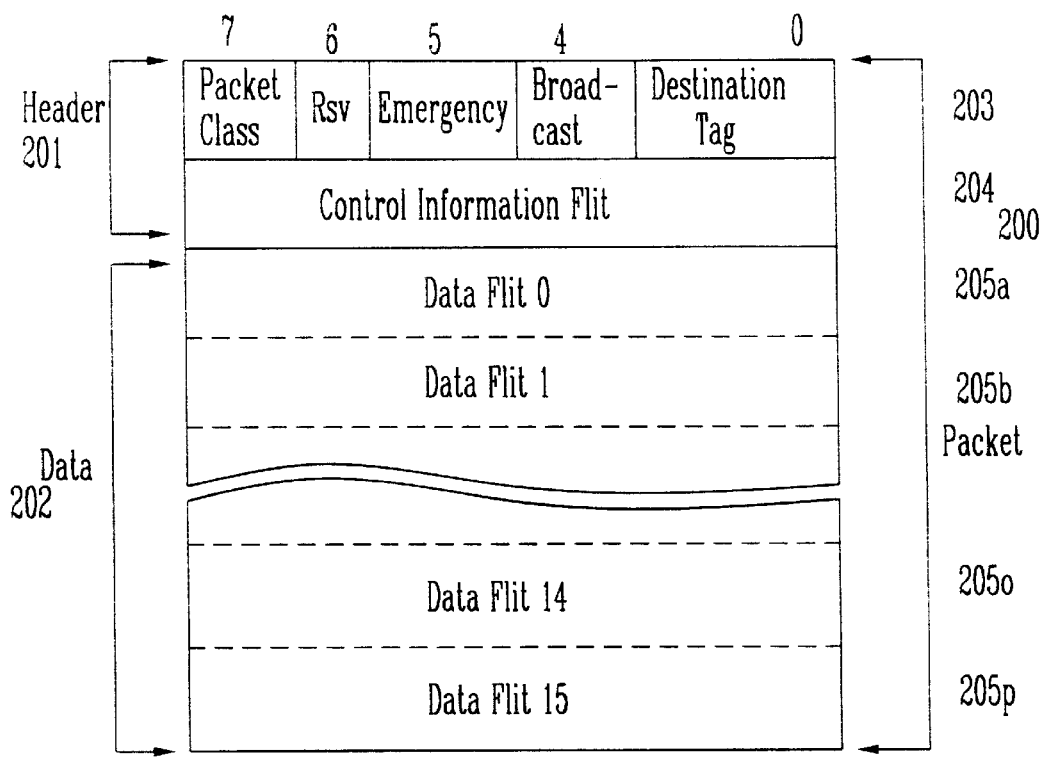
FIG. 2 is a constructional view of a packet including a tag flit and a control information flit according to the present invention.

FIG. 2 is a constructional drawing of a packet used in the crossbar routing switch. A packet 200 comprises a header portion 201 and a data portion 202. The header portion 201 consists of a tag flit 203 and control information flit 204. Here, the terminology "flit" means a data unit physically transferred as a basic unit constituting the packet. The tag flit 203 consists of eight bits as shown in FIG. 2, where bit 7 classifies a packet class, that is, a data packet and a network control packet, bit 5 classifies an emergency transfer and a normal transfer, and bit 4 classifies a broadcast transfer and a point-to-point transfer. Bit 6 is a reserved bit having no particular meaning. Bit 3 to bit 0 represent a destination tag address, and since the crossbar rounding switch of FIG. 1 provides ten ports, addresses of only port 0 to 9 are used.

The control information flit 204 is a segment in which a user arbitrarily define and use in case of data packet and is used for information exchange between two nodes, that is, a source node and a destination node connected to the input port and the output port. However, in case of a network control packet, the control information flit 204 is used to define a port separation or combination function vector.

The data portion 202 of a packet 200 consists of a plurality of data flits 205a to 205p. The data flits 205a to 205p store pure data for transfer from the input port to the output port.

Figure 3:
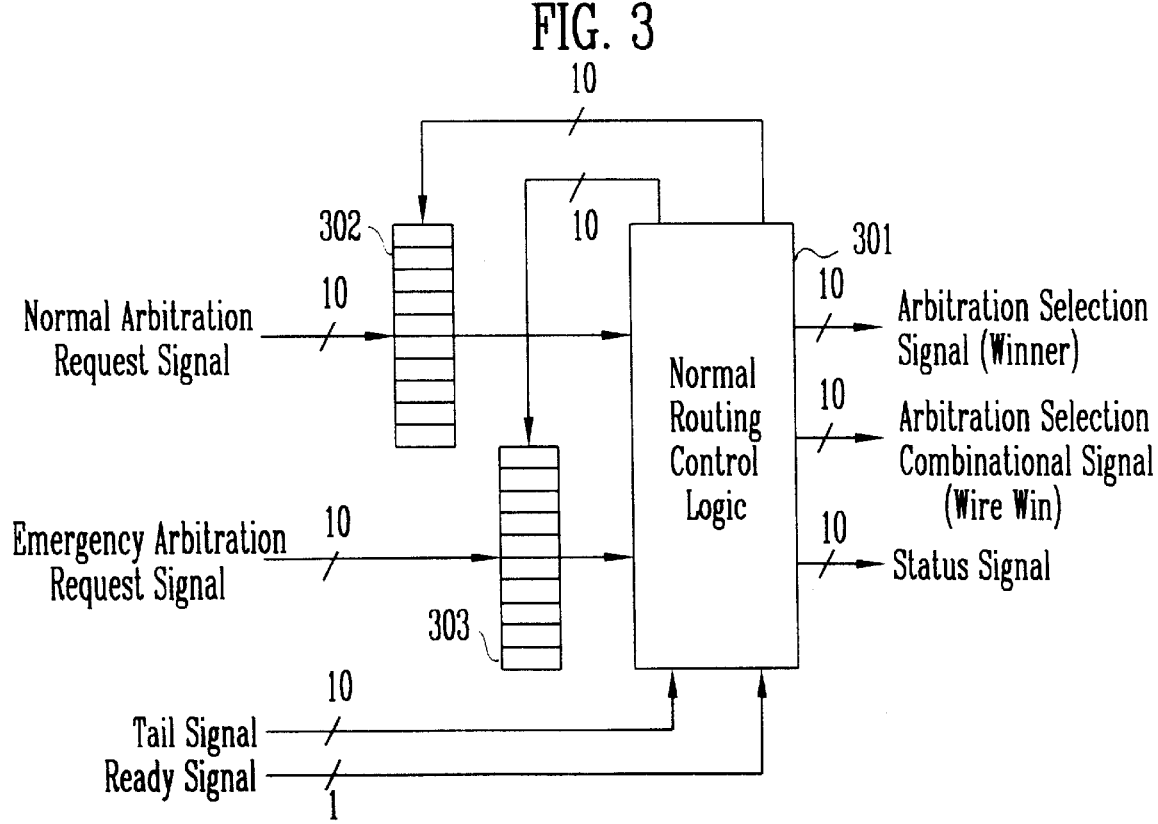
FIG. 3 shows a Normal Routing Controller Unit according to the present invention.

FIG. 3 shows exterior interface signals of a normal routing controller corresponding to the normal routing controller units 105a to 105h in the crossbar core module 101 of FIG. 1. The arbitration request units 104a to 104j in the crossbar core module 104 of FIG. 1 interpret the packet tag of FIG. 2 and drive a normal arbitration request signal ReqArb[9 . . . 0] or an emergency arbitration request signal ReqEmg[9 . . . 0] to the corresponding normal routing controller unit 105a to 105h and the corresponding adaptive routing controller unit 106. The input controller modules 102a to 102j of FIG. 1 drive a tail signal tail[9 . . . 0] denoting the end portion of a packet to the corresponding normal routing controller unit 105a to 105h and the corresponding adaptive routing controller unit 106 by using a packet valid signal valid transferred from the exterior of the crossbar routing switch 100.

The output controller modules 103a to 103j of FIG. 1 latch a ready signal Ready transferred from the exterior of the crossbar routing switch and drives a ready signal Xready to the corresponding normal routing controller unit 105a to 105h and the corresponding adaptive routing controller unit 106.

The normal routing controller units 105a to 105h receive the normal arbitration request signal ReqArb[9 . . . 0], the emergency arbitration request signal ReqEmg[9 . . . 0], the tail signal tail[9 . . . 0] and ready signal Xready, and drives to the output two kinds of arbitration selection signals winner and wirewin which are results of arbitration and a status signal status representing an arbitratibility.

The normal routing controller units 105a to 105h each comprises a normal routing control logic 301 for performing priority based round robin arbitration and controlling an internal logic and two mask registers for priority based round robin arbitration, that is, a normal transfer mask register 302 and an emergency transfer mask register 303. The normal transfer mask register 302 connects, bit by bit, ten bits of the normal arbitration request signal ReqArb[9 . . . 0] and ten bits driven from the normal routing control logic 301 to the inputs of AND gates and provides outputs back to the normal routing control logic 301. That is, since the normal transfer mask register 302 provides AND gates for each bit and storage for each bit, a total of ten AND gates and ten bit storages are utilized. For example, one bit of the normal arbitration request signal ReqArb[9] of port 9 and one bit corresponding to port 9 driven from the normal routing control logic 301 are inputted to an AND gate, the output of the AND gate is inputted to the 1-bit storage, and the output of the 1-bit storage is driven to the normal routing control logic 301.

The emergency transfer mask register 303 connects, bit by bit ten bits of the emergency arbitration request signal ReqEmg[9 . . . 0] and other ten bits driven from the normal routing control logic 301 to the inputs of AND gates and provides outputs back to the normal routing control logic 301. The constitution of the emergency transfer mask register 303 is same as that of the normal transfer mask register 302.

Figure 4:
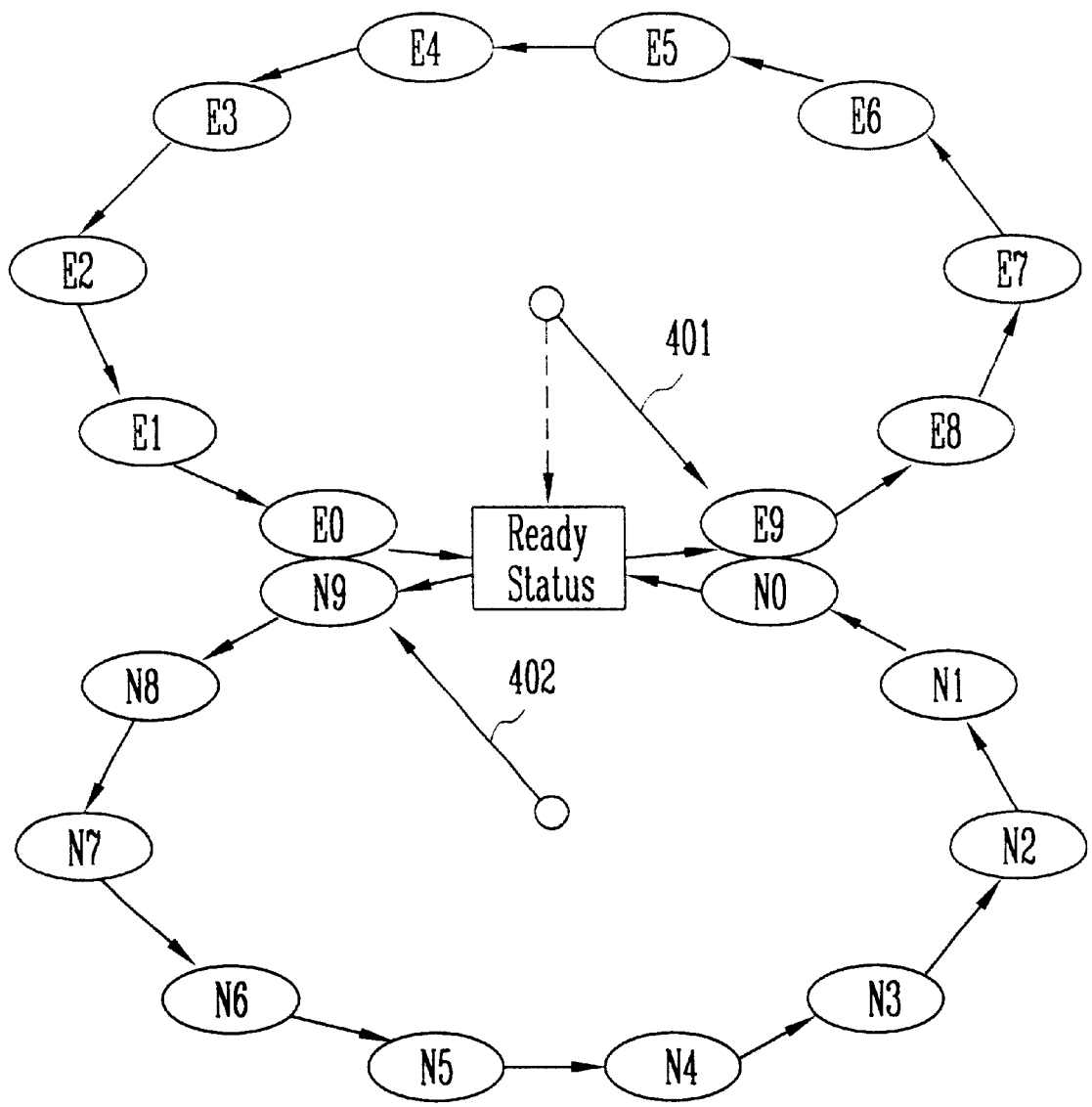
FIG. 4 shows a priority based round robin arbitration method according to the present invention.

The normal routing control logic 301 performs the priority based round robin arbitration illustrated in FIG. 4 and plays the role of controlling an internal logic including the normal transfer mask register 302 and emergency transfer mask register 303. The normal routing control logic 301 performs the arbitration according to a priority based round robin arbitration rule illustrated in FIG. 4 by taking as inputs the signal of twenty bits driven from the normal transfer mask register 302 and emergency transfer mask register 303 and notifies the result by driving two kinds of arbitration selection signals(winner, wirewin).

Two kinds of arbitration selection signals(winner, wirewin) can be classified into an arbitration selection sequential signal(winner, sequential logic) which drives the result of arbitration after storing it in the storage by using a clock, and an arbitration selection combinational signal (wirewin, combinational logic) which is a signal directly before storing the result of arbitration in the storage. The arbitration selection combinational signal can know the result of arbitration one clock earlier than the arbitration selection sequential signal.

Since the arbitration selection signals(winner, wirewin) are used as information for physical routing pass at the data pass controller unit 107a to 107j, the arbitration selection signals are continuously driven until all the packet data pass through the physical routing pass. If a corresponding bit tail signal among the tail signal tail [9 . . . 0] notifying the end of packet data is driven, the normal routing control logic 301 retracts the arbitration selection signal(winner, wirewin), updates twenty bits of normal transfer and emergency transfer mask information, and drives them to the normal transfer mask register 302 and the emergency transfer mask register 303, and thereafter proceeds to a ready state for next arbitration. A status signal(status) notifies whether the status of the normal routing control logic 301 is in an arbitration status or a ready status.

FIG. 4 is a status diagram showing the priority based round robin arbitration method performed at the routing control logic of FIG. 3. The ten bit signals driven at the normal transfer mask register 302 of FIG. 3 correspond to ten states, that is, N9 . . . , N0, etc. In addition, the ten bit signals driven at the emergency transfer mask register 303 of FIG. 3 correspond to ten states, that is, E9, . . . , E0, etc. Two kinds of pointers are used for the priority based round robin arbitration, one is an emergency transfer pointer 401 and the other is a normal transfer pointer 402.

When both of the emergency transfer pointer 401 and normal transfer pointer 402 are in the ready state(IDLE), the ten bit normal transfer mask information and ten bit emergency transfer mask information are all driven to a logic 1. The emergency transfer pointer 401 is higher in its priority than the normal transfer pointer 402, and the normal transfer pointer 402 is operated only at the time the emergency transfer pointer 401 is in the ready state(IDLE). In case of conventional round robin arbitration, each state is allocated with its own time slot so that it has its own time slot even in a case the state is not valid. This totally causes a waste of time and can be inefficient.

In the priority based round robin arbitration of the present invention, a time slot is allocated only to a request of valid state. For example, in case the emergence transfer pointer 401 is presently in the ready state(IDLE) and only E9state and E6 state are valid, the arbitration result arbitrates E9state and arbitrates E6state in the next time slot. The meaning of the ready state(IDLE) is different for the emergency transfer pointer 401 and for normal transfer pointer 402. In case at least one state among the normal transfer states N9 . . . , N0 is valid, the ready state(IDLE) is recognized as a valid ready state at the emergence transfer point 401. For example, in case the emergency transfer pointer 401 is in E4 state and E1 state, E8 state and N7 state valid, the arbitration result arbitrates E1 state, thereafter the emergency transfer pointer 401 being in the ready state, arbitrates N7 state at the same time, thereafter arbitrates E8 state. In case the normal transfer state including N7 state are all not valid, the arbitration result arbitrates E1 state and directly thereafter arbitrates E8 state.

While the ready state(IDLE) is recognized as a valid ready state and an invalid ready state at the emergency transfer pointer 401, the ready state at the normal transfer pointer 402 are all recognized as an invalid ready state. That is, in case N0 state and N7 state are valid under the situation that the emergency transfer pointer 401 is in the ready state(IDLE) and the normal transfer pointer 402 is in N3, the arbitration result arbitrates N0 state and directly thereafter arbitrates to N7 state.

The priority based round robin arbitration method described above offers the fairness for each state, and prevents starvation on in which any one state can not be eternally arbitrated.

Figure 5:
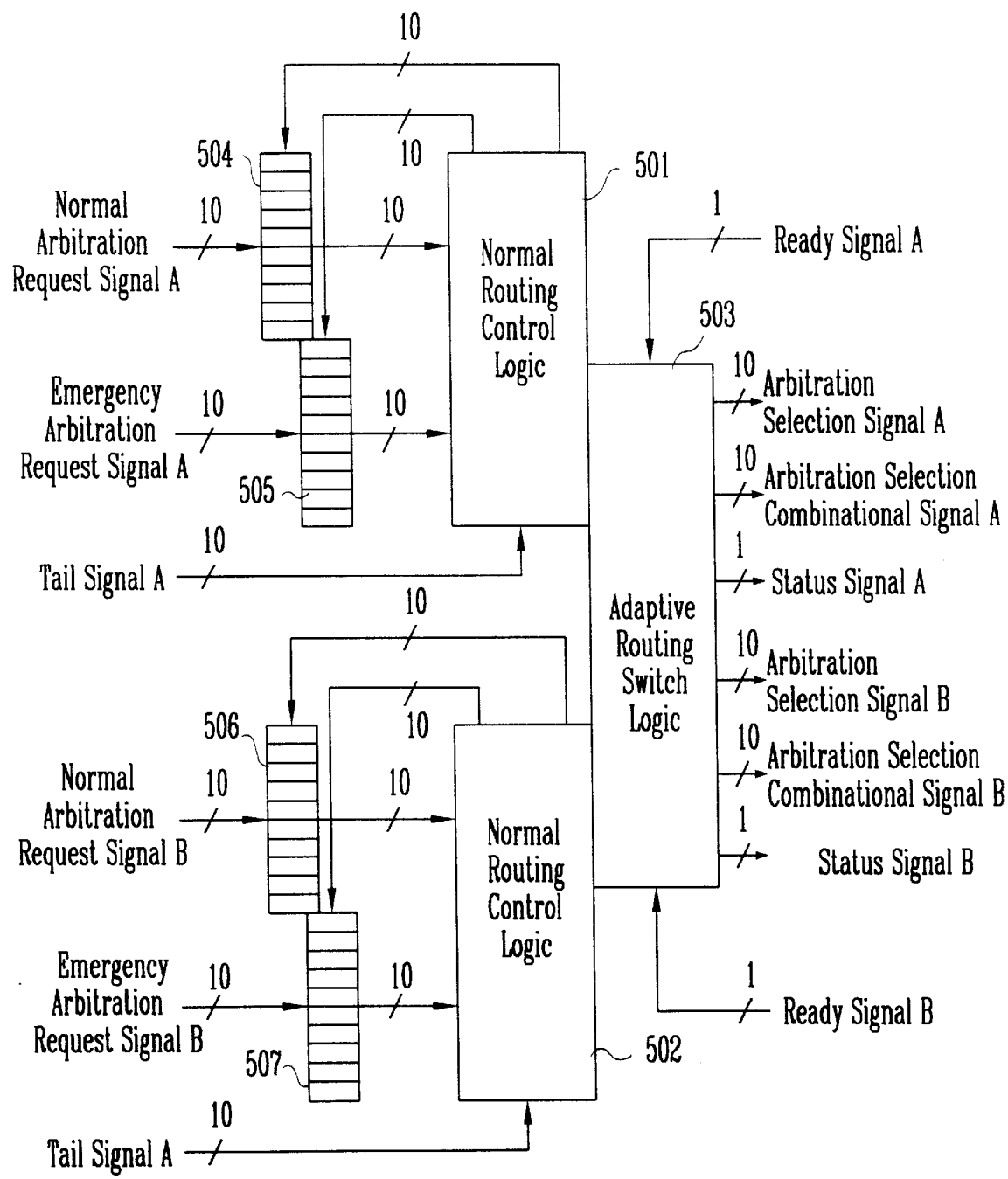
FIG. 5 shows an Adaptive Routing Controller according to the present invention.

FIG. 5 shows external interface signals of the adaptive routing controller corresponding to the adaptive routing controller unit 106 in the crossbar core module 101 of FIG. 1. The arbitration request unit 104a to 104j in the crossbar core module 101 of FIG. 1 interpreted the packet tag of FIG. 2 and drives the normal arbitration request signal ReqArb[9 . . . 0] or emergency arbitration request signal ReqEmg[9 . . . 0] to the corresponding normal routing controller units 105a to 105h and the corresponding adaptive routing controller unit 106. The input controller modules 102a to 102j of FIG. 1 drive the tail signal tail[9 . . . 0] notifying the rear portion of packet to the corresponding normal routing controller units 105a to 105h and the corresponding adaptive routing controller unit 106 by using the packet valid signal(valid) transferred from the outside of the crossbar routing switch 100. The output controller modules 103a to 103j of FIG. 1 latch the ready signal(Ready) transferred from the outside of the crossbar routing switch 100 and drive the ready signal Xready to the corresponding normal routing controller units 105a to 105h and the corresponding adaptive routing controller unit 106.

The adaptive routing controller unit 106 receives the above described two normal arbitration request signals ReqArb[9 . . . 0]_A, ReqArb[9 . . . 0]_B, two emergency arbitration request signals ReqEmg[9 . . . 0]_A, ReqEmg[9 . . . 0]_B, two tail signals tail[9 . . . 0]_A, tail[9 . . . 0]_B and two ready signals Xready_A, Xready_B, and drives to the outputs two arbitration selection sequential signals winner A, winner B, two arbitration selection combinational signals wirewin A, wirewin B and two status signal status A, status B which are the results of arbitration.

A normal transfer mask register 504 connects, bit by bit, ten bits of the normal arbitration request signal ReqArb[9 . . . 0]_A and ten bits driven from the normal routing control logic 501 to the inputs of AND gates and provides outputs back to the normal routing control logic 501.

The adaptive routing controller unit 106 performs the priority based round robin arbitration in detail and consists of two normal routing control logic 501, 502 for controlling the internal logic, an adaptive routing switch logic 503, and four mask registers for priority based round robin arbitration, that is, two normal transfer mask registers 504, 506 and two emergency transfer mask registers 505, 507.

The constitution of the normal transfer mask register 504 is same as that of the normal transfer mask register 302 of FIG. 3. The other normal transfer mask register 506 has the same constitution described above. An emergence transfer mask register 505 connects, bit by bit, ten bits of the emergency arbitration request signal ReqEmg[9 . . . 0]_A and other ten bits driven from the normal routing control logic 501 to the inputs of AND gates and provides outputs back to the normal routing control logic 501. The constitution of two emergency transfer mask registers 505, 507 is same as that of the normal transfer mask register 504, 506.

The normal routing control logic 501, 502 performs the priority based round robin arbitration illustrated in FIG. 4 and plays the role of controlling an internal logic including the normal transfer mask register 504, 506 and emergency transfer mask register 505, 507. The normal routing control logic 501, 502 performs the arbitration according to a priority based round robin arbitration rule illustrated in FIG. 4 by taking as inputs the signal of twenty bits driven form the normal transfer mask register 504, 506 and emergency transfer mask register 505, 507 and drives the result to each corresponding adaptive routing switch logic 503.

The adaptive routing switch logic 503 receives the result form the two normal routing control logic 501, 502 and drives the corresponding arbitration selection signals (winner A, winner B, wirewin A, wirewin B) and two status signals (status A, status B) according to the adaptive routing switch function of Table 1 by taking as inputs two ready signals Xready A, Xready B. The arbitration selection signal (winner A, winner B, wirewin A, wirewin B) can be classified into an arbitration selection sequential signal(winner A, winner B) which drives the result of arbitration after storing it in the storage by using a clock, and an arbitration selection combinational signal(wirewin A, wirewin B) which is a signal directly before storing the result of arbitration in the storage. The arbitration selection combinational signal can know the result of arbitration one clock earlier than the arbitration selection sequential signal.

Since the arbitration selection signals(winner A, winner B, wirewin A, wirewin B) are used as information for physical routing pass at the data pass controller unit 107i to 107j, the arbitration selection signals are continuously driven until all the packet data pass through the physical routing pass. If a tail signal tail[9 . . . 0]_A, tail[9 . . . 0]_B notifying the end of packet data is drive, the normal routing control logic 504, 506 retracts the arbitration selection signal(winner A, winner B, wirewin A, wirewin B), updates twenty bits of normal transfer and emergency transfer mask information, and drives them to the normal transfer mask register 504, 506 and emergency transfer mask register 505, 507, and thereafter proceeds to a ready state for next arbitration. Two status signals (status A, status B) each notifies whether the status of the normal routing control logic 501, 502 is in the arbitration status or ready status.

A table 1 shown below represents an operational function of the adaptive routing switch logic. When a signal driven from one normal routing control logic 501 is defined as a result of "arbiter A" and a signal driven form other normal routing control logic 502 is defined as a result of "arbiter B". The table 1 represents a function operating according to the arbiter A, arbiter B, ready signal A and ready signal B.

When the results of arbiter A and arbiter B are true and the ready signal A and ready signal B are respectively true, the correspond port A or B is outputted, and when the results of arbiter A and B are true and only one of the ready signals A and B is true, the ports A and B are sequentially outputted as a result of arbitration.

TABLE 1

| arbiter A | arbiter B | ready signal A | ready signal B | arbitration result A | arbitration result B |
|---|---|---|---|---|---|
| 1 | 1 | 1 | 1 | A port output | B port output |
| 1 | 1 | 1 | 0 | A/B sequentially output | |
| 1 | 1 | 0 | 1 | | B/A sequentially output |
| 1 | 1 | 0 | 0 | | |
| 1 | 0 | 1 | X | A port output | |
| 1 | 0 | 0 | 1 | | A port output |
| 0 | 1 | X | 1 | | B port output |
| 0 | 1 | 1 | 0 | B port output | |
| 0 | 0 | X | X | | |

When only one of the results of arbiter A and arbiter B is true as shown in table 1, the corresponding function is perform according to the corresponding position and the statuses of ready signals A and B.

As described above, the present invention can implement a crossbar routing switch of high performance and high function by providing a routing controller adapted to the inherent function and characteristics of the crossbar routing switch by inventing a priority based round robin arbitration method for offering fairness and preventing starvation and a normal routing controller for performing the method and by inventing an adaptive routing controller for performing an adaptive routing control by adding an adaptive routing switch logic to two normal routing controllers.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What is claimed is:

1. An adaptive routing controller of a crossbar core module used in a crossbar routing switch having a plurality of input controller modules and a plurality of output controller modules, comprising:
    a plurality of normal routing control logic for performing a port priority-based round robin arbitration using both request level priorities and port geographical priorities and controlling an internal logic;
    an adaptive routing switch logic for receiving a signal of said normal routing control logic and a ready signal, and outputting a plurality of corresponding arbitration selection sequential signals, status signals and arbitration selection combination signals to perform an adaptive routing control which indicates that an incoming packet encountering with blocking of its routing path passes through an alternative path; and
    a plurality of mask registers for performing a port priority-based round robin arbitration, wherein said mask registers include a plurality of normal transfer mask registers for connecting, bit by bit, ten bits of normal arbitration request signals and ten bits driven from said normal routing control logic to inputs of AND gates and for providing outputs back to said normal routing control logic, and a plurality of emergency transfer mask registers for connecting, bit by bit, ten bits of emergency arbitration request signals and ten bits driven from said normal routing control logic to the inputs of AND gates and for providing outputs back to said normal routing control logic.

2. The adaptive routing controller as claimed in claim 1, wherein said input controller modules each comprises:
    a data buffer arranged to temporarily store the incoming packet, when the incoming packet encounters blocking of its routing path;
    a data synchronizer arranged to establish synchronization with the incoming packet and transfer the incoming packet to said data buffer for storage; and
    a controller arranged to control input and output flow of said data buffer and to notify the status of said data buffer to said crossbar core module.

3. The adaptive routing controller as claimed in claim 2, wherein said output controller modules each comprises an output ready synchronizer arranged to establish synchronization with the incoming packet which passes through said crossbar core module.

4. The adaptive routing controller as claimed in claim 3, further comprising a global controller arranged to control resources of said input controller modules, said crossbar core module and said output controller modules.

5. A crossbar routing switch, comprising:
    input controller modules arranged to input data packets, via input ports;
    output controller modules arranged to output data packets, via output ports; and
    a crossbar core module arranged to rout data packets from said input ports to said output ports based on a port priority based round robin arbitration using request level priorities and port geographical priorities, said crossbar core module comprising:
    a plurality of normal routing control logic arranged to perform said port priority based round robin arbitration using said request level priorities and port geographical priorities;
    an adaptive routing switch logic arranged to receive outputs of said normal routing control logic and generate corresponding arbitration selection sequential signals, status signals and arbitration selection combination signals so as to perform an adaptive routing control which indicates that an incoming data packet encountering with blocking of its routing path passes through an alternative path;
    normal transfer mask registers including AND gates arranged to receive, bit by bit, all bits of a normal arbitration request signal and provide an output to said normal routing control logic; and
    emergency transfer mask registers including AND gates arranged to receive, bit by bit, all bits of an emergency arbitration request signal and provide and output to said normal routing control logic.

6. The crossbar routing switch as claimed in claim 5, wherein said input controller modules each comprises:

a data buffer arranged to temporarily store the incoming packet, when the incoming packet encounters blocking of its routing path;

a data synchronizer arranged to establish synchronization with the incoming packet and transfer the incoming packet to said data buffer for storage; and a controller arranged to control input and output flow of said data buffer and to notify the status of said data buffer to said crossbar core module.

7. The crossbar routing switch as claimed in claim 6, wherein said output controller modules each comprises an output ready synchronizer arranged to establish synchronization with the incoming packet which passes through said crossbar core module.

8. The crossbar routing switch as claimed in claim 7, further comprising a global controller arranged to control resources of said input controller modules, said crossbar core module and said output controller modules.

9. An adaptive routing controller of a crossbar core module used in a crossbar routing switch having a plurality of input controller modules with input ports and a plurality of output controller modules with output ports, comprising:

a plurality of normal routing control logic arranged to rout data packets from said input ports to said output ports based on a port priority based round robin arbitration using request level priorities and port geographical priorities;

an adaptive routing switch logic arranged to receive outputs of said normal routing control logic and generate corresponding arbitration selection sequential signals, status signals and arbitration selection combination signals so as to perform an adaptive routing control which indicates that an incoming data packet encountering with blocking of its routing path passes through an alternative path;

normal transfer mask registers including AND gates arranged to receive, bit by bit, all bits of a normal arbitration request signal and provide an output to said normal routing control logic; and emergency transfer mask registers including AND gates arranged to receive, bit by bit, all bits of an emergency arbitration request signal and provide and output to said normal routing control logic.

10. The adaptive routing controller as claimed in claim 9, wherein said input controller modules each comprises:

a data buffer arranged to temporarily store the incoming packet, when the incoming packet encounters blocking of its routing path;

a data synchronizer arranged to establish synchronization with the incoming packet and transfer the incoming packet to said data buffer for storage; and a controller arranged to control input and output flow of said data buffer and to notify the status of said data buffer to said crossbar core module.

11. The adaptive routing controller as claimed in claim 9, wherein said output controller modules each comprises an output ready synchronizer arranged to establish synchronization with the incoming packet which passes through said crossbar core module.

12. The adaptive routing controller as claimed in claim 9, further comprising a global controller arranged to control resources of said input controller modules, said crossbar core module and said output controller modules.

\* \* \* \* \*